United States Patent [19]

Stone

[11] 4,242,152
[45] Dec. 30, 1980

[54] METHOD FOR ADJUSTING THE FOCUS AND POWER OF A TRIMMING LASER

[75] Inventor: Richard H. Stone, Sunnyvale, Calif.

[73] Assignee: National Semiconductor Corporation, Santa Clara, Calif.

[21] Appl. No.: 38,600

[22] Filed: May 14, 1979

[51] Int. Cl.² ............................................. B23K 26/00
[52] U.S. Cl. ................................... 148/9.5; 148/9 R; 219/121 LM
[58] Field of Search .............................. 148/9 R, 9.5; 219/121 LM

[56] References Cited
U.S. PATENT DOCUMENTS

| | | | |
|---|---|---|---|
| 3,837,855 | 9/1974 | Rousseau et al. | 148/6 |
| 4,084,988 | 4/1978 | Engel et al. | 148/9.5 |

*Primary Examiner*—Howard S. Williams
*Attorney, Agent, or Firm*—Woodward, Gail W.; James A. Sheridan

[57] ABSTRACT

A laser is used to cut slots into a film deposited on a substrate so that a clean kerf is produced without harming the substrate. The laser cut vaporizes the film material as the removal mechanism and some of the vaporized material will redeposit over the surface of the film adjacent to the kerf. When the redeposited material is illuminated and viewed obliquely a series of light fringes can be observed. The laser focus is adjusted until the fringe pattern is symmetrical about the kerf. The laser power is adjusted until the fringes extend to about three times the kerf width on both sides of the kerf. This provides a precision nonsubjective means for adjusting laser focus and power.

12 Claims, 7 Drawing Figures

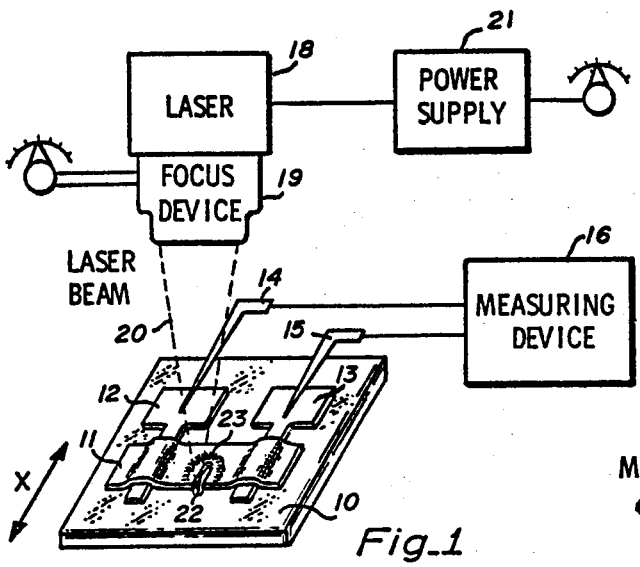
Fig_1
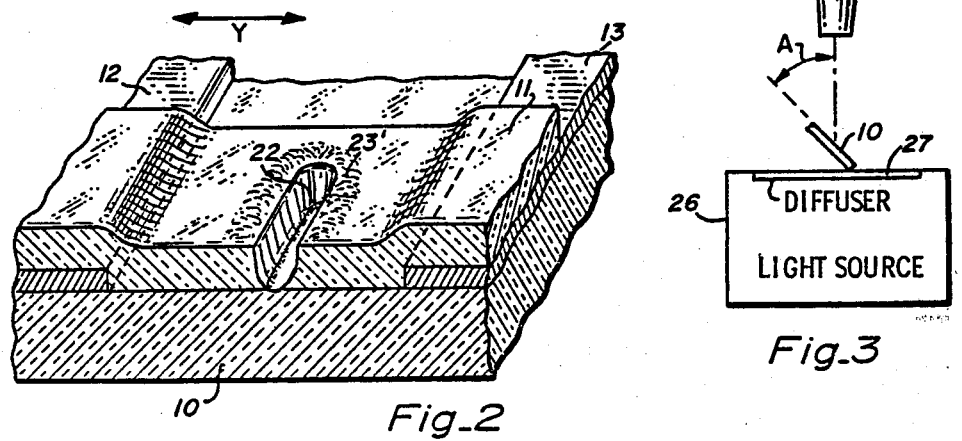
Fig_2
Fig_3
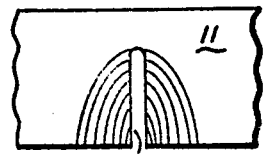
Fig_4
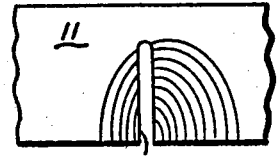
Fig_5
Fig_6
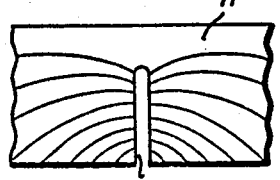
Fig_7

METHOD FOR ADJUSTING THE FOCUS AND POWER OF A TRIMMING LASER

BACKGROUND OF THE INVENTION

The invention relates to the laser trimming of films deposited on substrates. In particular, the invention is useful in the laser trimming of so called thick film resistors. Typically a high alumina substrate is provided with a pattern of metal resistor terminals. Then a layer of usually proprietary composition is deposited or screened onto the substrate so that a continuous film extends between the metal terminal ends of resistor elements. The deposited material is then fired at elevated temperature to cause the screened composition to set into a state that is stable and yields suitable resistor characteristics. Since such a screening process will produce only approximately correct resistor values it is common practice to trim the deposited films after firing to achieve a precise resistor value. Normally the resistor is manufactured to a value that is reliably below the target value. Then each one is trimmed to the desired value and precision.

Laser trimming has proven to be exceptionally well suited to such trimming. Normally the laser is focused to its smallest spot size on the ceramic substrate surface. Then the power is adjusted until a clean kerf with a suitable crystalline edge is produced. Trimming is then accomplished with occasional, readjustment as desired. Obviously, this procedure is highly subjective and even with highly trained operators, is not reproduceable. If too much laser power is employed, there will be excessive destruction of the substrate and possibly substrate burning. Too little power results in a ragged kerf which makes the trimming unpredictable.

In terms of laser focus the shape of the typical laser focal saddle makes it difficult to observe. If the focus is incorrect the actual hot spot may be elliptical so that cuts along one ellipse axis will be wider than perpendicular cuts. With this condition the laser trim rate will be different for various cut directions. When the focus is proper, the hot spot will be round and the material removal rate will be the same in all cut directions. It turns out that the actual focus should be slightly below the substrate surface. Typically it has been found that the best focus point is about one-half micron below the ceramic surface. As a matter of experience it has been found that focusing the laser is a trial and error process highly dependent upon the skill of the operator.

SUMMARY OF THE INVENTION

It is an object of the invention to provide a precision means for adjusting the power and focus of a laser useful in film trimming.

It is a further object of the invention to incorporate steps in a laser trimming process that assures proper laser power and focus.

These and other objects are achieved as follows. A laser beam is used to make a cut in a deposited film. The material removal operation is one of vaporization so that a cloud of vaporous material is developed over the kerf produced in the film. Some of this material will condense back on the film surface in a thin layer in the vicinity of the kerf. If the surface of the film near the kerf is viewed obliquely using a large area illumination source, the redeposited film will manifest itself by producing light fringes that are easily observed. If the laser is incorrectly focused, the fringe pattern will be unsymmetrical about the kerf. Therefore, the laser focus is adjusted for a symmetrical fringe pattern. The laser power is adjusted for a desired size of redeposted film area. When the fringe pattern extends for about three (plus or minus one) kerf widths on each side of the kerf, the laser power is very close to optimum.

BRIEF DESCRIPTION OF THE DRAWING

FIG. 1 shows a laser film trimming system;
FIG. 2 shows a trimmed resistor partly in cross section and partly in top elevation;
FIG. 3 shows a viewing and illumination system useful in producing fringe patterns;
FIG. 4 shows the fringe pattern produced by a correctly adjusted laser;
FIG. 5 shows the fringe pattern for an out of focus laser;
FIG. 6 shows the fringe pattern for too little laser power; and
FIG. 7 shows a fringe pattern for too high laser power.

DESCRIPTION OF THE INVENTION

In FIG. 1, a laser trimming system is shown largely in block diagram form. A substrate 10 is shown with a single resistor 11 that has been deposited thereon so as to overlap a pair of metallization deposits that terminate in pads 12 and 13. While only a single resistor is shown, it is to be understood that ordinarily a single high alumina substrate wafer may contain a plurality of such resistors deposited over a metallization pattern that also acts to connect the resistors with other active and passive components to create a complete integrated circuit. Such circuits are called hybrid integrated circuits.

Additionally, the ceramic substrate can be a large slab that contains a plurality of separate integrated circuits on its face. After the circuits are manufactured, the slab is broken apart to create a plurality of separate circuit chips.

Since this application relates to the film trimming, only one resistor is shown on a single ceramic substrate. Pads 12 and 13 are contacted by means of probe contacts 14 and 15 which are connected to measuring device 16. Here the resistor value could be monitored. In a typical hybrid thick film resistor process, resistor 11 would be screened onto substrate 10 and fired to form a stable resistance film that is desirably too low in ohmic value. First the resistance is measured by device 16 and the actual resistor value determined. A laser 18 is focused by device 19 to form a convergent beam 20. Ideally, the laser beam focus is slightly below the ceramic substrate surface. An adjustable power supply 21 controls the laser output so that the beam vaporizes the film material at its focus. The beam impingement point can be translated along the X and Y axes by conventional means not shown. For example, the work table holding substrate can be moved, or the laser can be moved. Alternatively, the laser beam can be deflected optically. The beam is caused to traverse the resistor to create a kerf as shown at 22. The length of the kerf is made such as to raise the resistance value to the desired level. Actually, a series of cuts can be made with decreasing bites so that as the desired value is approached the precision increases and a close tolerance resistor can be manufactured.

Ordinarily, the starting laser beam impingement point is located just outside the resistor edge. Then the laser is turned on and the beam translated so as to cut across the resistor perpendicular to the direction of current flow through the resistor.

The laser can be of the continuous or CW type, or it can be pulsed. If pulsed, the laser beam translation is accomplished so that the pulses overlap to create a clean kerf. I have used an Nd:YAG laser optically pumped to produce an average power output of about one watt at the focal plane. The laser can be Q-Switched at a rate of about 3,000 pulses per second and the beam translated at a rate of about 2 inches per second to provide an excellent thick film resistor trim. The laser power can be precision adjusted by controlling the pump power.

When the laser beam is caused to vaporize the resistor material, a vapor cloud is formed at 23. This cloud will condense, at least in part, back onto the surface adjacent to the kerf. FIG. 2 shows an enlarged view of a resistor on a substrate. The same numerals are used to identify the parts shown in FIG. 1. The kerf shown at 22 is of the desired shape. It extends slightly into substrate 10 thus ensuring complete resistance film removal. The edges are clean and straight thus indicating a reproduceable process. The redeposited film material is indicated generally at 23'.

I have discovered an unexpected relationship between the redeposited material and the adjustment of the laser. Accordingly, it is necessary to observe the redeposited material. FIG. 3 shows such an observing system. A microscope 25 is used to observe the film in the vicinity of a kerf. Substrate 10 is viewed at an oblique angle A with respect to the surface plane. The resistor surface is illuminated from a large area source 26 which is shown as a light box having a translucent diffuser surface 27. Using this source or a suitable equivalent and viewing at an angle A of between about 10 and 45 degrees, the redeposited film 23' can be observed by the light fringe pattern it creates. FIG. 4 shows such a light fringe pattern.

For reasons that are not fully understood, it has been found that if the laser is not properly focused, the redeposited film will not be symmetrically located about the kerf. FIG. 4 shows the pattern produced by a properly focused laser. FIG. 5 shows the pattern produced by improperly focused laser. The fringes extend further on the right hand side of the kerf. If the laser were to be misfocused in the other direction, the fringe pattern would be dominantly located to the left of the kerf. Thus, a precision means for focusing the laser is available. The focus is adjusted for a symmetrical pattern as shown in FIG. 4.

In FIG. 4, it can be seen that the light fringe pattern extends for about three kerf widths on either side of the kerf. This indicates the correct power level. Two to four kerf widths indicate that the laser power level is within the desired range. FIG. 6 shows the light fringe pattern for too low laser power and FIG. 7 shows the light fringe pattern for too high laser power.

The foregoing shows that precision power and focus adjustments are available for the trimming laser. The adjustments can be made precisely and are nonsubjective.

The invention has been described and its operation detailed. Clearly, there are alternatives and equivalents that will occur to a person skilled in the art. Accordingly it is intended that the scope of the invention be limited only by the claims that follow.

I claim:

1. A process for trimming a deposited film on a substrate, using a laser to vaporize film material to produce a kerf therein, said process comprising the steps: applying a laser beam to said film to vaporize a portion thereof for controlling the characteristics of said film, whereby at least a portion of said vaporized material redeposits on the surface of said film in the vicinity of said kerf;
illuminating said redeposited material;
viewing said redeposited material at an angle so that said illumination produces light fringes; and
adjusting said laser to produce a predetermined light fringe configuration.

2. The process of claim 1, wherein the focus of said laser is adjusted to produce a fringe configuration comprising a symmetrical disposition about said kerf.

3. The process of claim 1, wherein the power of said laser is adjusted to produce a fringe configuration of predetermined size.

4. The process of claim 3 further including the step of adjusting the power output of said laser until said light fringes extend for a distance of between about two to four times the width of said kerf on each side of said kerf.

5. The process of claim 1, wherein said viewing is accomplished at an angle of between about 10 and 45 degrees with respect to the plane of the surface of said film.

6. The process of claim 5, wherein said illumination is a diffuse large area source arranged to illuminate said film from a direction opposite to said viewing.

7. A process for adjusting a laser to be used in the trimming of a film deposited on a substrate, wherein the beam generated by said laser is caused to traverse a portion of said film which is thereby removed by vaporization to leave a kerf in said film, said process comprising the steps:
operating said laser to create a kerf in a deposited film in a test piece;
illuminating said film in the vicinity of said kerf so as to illuminate any material vaporized from said kerf that has redeposited on the surface of said film;
viewing the surface of said film in the vicinity of said kerf at an angle with respect to the plane of said surface so that said illumination produces visible light fringes in said redeposited film;
adjusting said laser; and
repeating the steps of operating, illuminating, viewing and adjusting until said light fringes assume a predetermined configuration.

8. The process of claim 7, wherein said adjusting is applied to the focus of said laser and said predetermined configuration is a symmetrical fringe pattern about said kerf.

9. The process of claim 7, wherein said adjusting is applied to the power of said laser and said predetermined configuration is a fringe pattern of predetermined size.

10. The process of claim 9 further including the steps of:
adjusting the power output of said laser; and
repeating the steps of operating, illuminating, viewing and adjusting the power until said light fringes extend for a distance of between about two to four times the width of said kerf on both sides of said kerf.

11. The process of claim 7, wherein said viewing is accomplished at an angle of between about 10 to 45 degrees from the plane of the surface of said film.

12. The process of claim 11, wherein said illumination is from a diffuse large area source located to illuminate said material from a direction opposite to that of said viewing.

* * * * *